A. A. PAGE.
SPEED CHANGING MECHANISM.
APPLICATION FILED MAR. 2, 1910.
959,878.
Patented May 31, 1910.
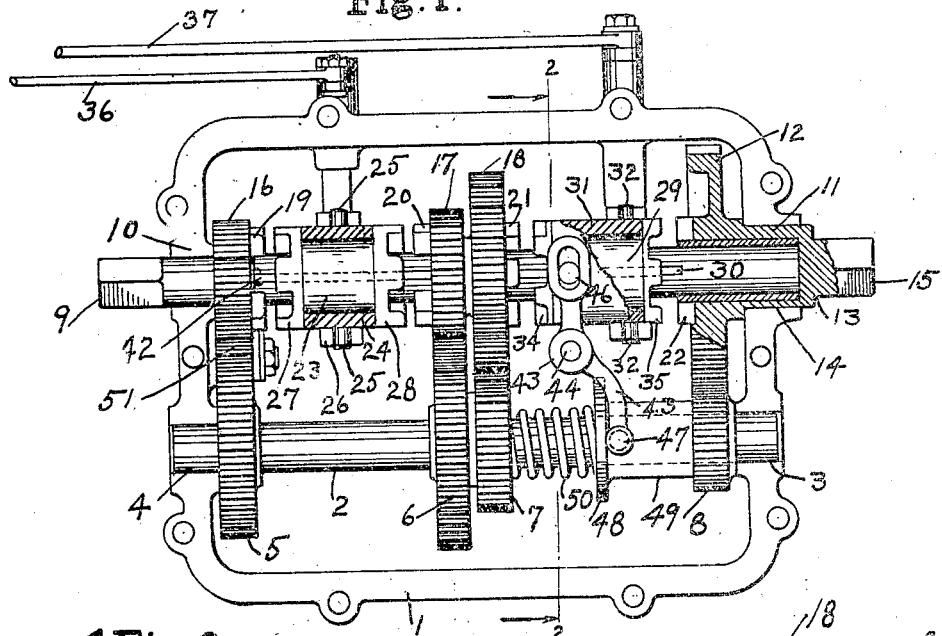

UNITED STATES PATENT OFFICE.

ARTHUR A. PAGE, OF PROVIDENCE, RHODE ISLAND.

SPEED-CHANGING MECHANISM.

959,878.  Specification of Letters Patent.  Patented May 31, 1910.

Application filed March 2, 1910. Serial No. 546,793.

*To all whom it may concern:*

Be it known that I, ARTHUR A. PAGE, a citizen of the United States, residing at Providence, in the county of Providence and State of Rhode Island, have invented certain new and useful Improvements in Speed-Changing Mechanism, of which the following is a specification, reference being had therein to the accompanying drawing.

This invention relates to improvements in speed changing mechanism for motor vehicles, and has for its object to provide a system of gears and clutches through which power is transmitted from the motor to the wheels of the vehicle and through which the different speeds may be obtained.

By the employment of sliding clutches for connecting and disconnecting the speed transmitting gears to and from the shafting the teeth of the gear are always in mesh, thereby permitting a fully developed tooth of the maximum strength to be used, thus reducing to the minimum the possibility of stripping.

A further object of my invention is to provide means whereby the mechanism on the jack shaft may be operatively disconnected from that on the main shaft so that said jack shaft with its attached mechanism will cease to rotate during the time the car is driving direct on the high speed. In order to accomplish this the small power transmitting gear on the jack shaft may be automatically withdrawn from mesh with the teeth of the large power transmitting or high speed gear on the main shaft whereby no gears will be driven in this mechanism while running on the high, or a clutch may be employed for disconnecting said shaft from said small driving gear, if desired.

With these and other objects in view, the invention consists of certain novel features of construction, as will be more fully described and particularly pointed out in the appended claims.

In the accompanying drawings: Figure 1—is a plan view of my transmission mechanism, partly in section, with the upper part of the inclosing casing removed. Fig. 2—is an elevation sectioned on line 2—2 of Fig. 1 looking in the direction of the arrows. Fig. 3—is a modification showing a clutch for disconnecting the small gear from the jack shaft. Fig. 4—is a central sectional elevation through the first and second speed gears on the main shaft, illustrating the simplified mechanism for retaining said gear in position longitudinally on said shaft.

Referring to the drawings, 1 designates an oil tight casing suitably constructed for inclosing the gears and clutches. The jack shaft 2 is mounted in bearings 3 and 4 in said case and on this shaft are keyed or permanently fixed the gears 5, 6 and 7 which are of varying diameters for the purpose of obtaining one reverse and two forward speeds therethrough, and gear 8 is slidably mounted on said shaft and is arranged to be operated in the manner hereinafter described.

The main driving shaft 9 may be connected at one end to the engine crank shaft through a main driving clutch (not shown), and is provided with a bearing at 10 on one edge of the casing and supported on its opposite end in the recessed portion 11 of the high speed gear 12. This gear is provided with a hub 13 which is formed integral therewith and extends out through the bearing 14 forming a square projecting member 15 which may be connected through a universal joint or other means to the wheel driving differential gearing not shown.

Loosely mounted on the main driving shaft 9 are the reverse gear 16, first speed gear 17 and intermediate speed gear 18, and fixed to and projecting from one face of each gear are the clutch members 19, 20, 21 and 22 respectively, the latter extending from gear 12.

A clutch member 23 is slidably mounted on a key 42 on shaft 9, the center of the clutch being provided with a collar 24 to the outwardly extending pins 25 in which are connected the arms of the yoke 26. The teeth 27 of this clutch are adapted to engage the corresponding teeth 19 on the gear 16, while those on the opposite end 28 of this clutch are adapted to engage the teeth 20 on the gear 17. The clutch member 29 is also mounted to slide endwise on the key 30 on shaft 9, said clutch being also provided with a loose collar 31 to the outwardly extending pins 32 in which is connected the upwardly extending arms of the shifting yoke 33. The teeth on one end 34 of this clutch member engages the clutch portion 21 of gear 18, while the opposite end 35 of said clutch member engages the teeth 22 of gear 12. Both of these yokes 25 and 33 may be manipulated and connected at will to either of their respective gears by operating suitable levers from the driver's seat through connecting rods 36 and 37 respectively, in the usual way, one form of connecting rod 37 to the yoke being illustrated in Fig. 2.

A simple, inexpensive and effective means for controlling the longitudinal position of gears 17 and 18 on shaft 9 is by providing collars 38 and 39, see Fig. 4, one on the outer side of each gear, said collars being provided with recesses 40 and 41 in their faces for the reception of the ends of the keys 30 and 42 respectively. Each of these keys is embedded in the shaft and by engaging these friction collars serve to retain the said gears from longitudinal movement on the shaft. The same construction is employed on one side of gear 16 for retaining the same in position, gear 12 being held by the end of shaft 9 which enters the central recess therein and abuts against the wall in the end thereof.

An essential feature of my construction is the provision of means whereby the jack shaft may be entirely disconnected from the main shaft so that the former will not rotate while the latter is running direct on the high speed. In order to accomplish this in the most satisfactory and effective manner, I preferably withdraw the small gear 8 from mesh with the large gear 12, which at once completely disconnects the driving elements from the jack shaft and also by this operation none of the gears in this system are being driven while the car is running direct on the high speed. This withdrawing operation is accomplished by means of a double ended forked lever 43, see Fig. 2, which is pivoted at 44 on the standard 45. One end of this lever is connected to pin 46 on the collar 31, while the opposite end is provided with inwardly extending pins 47 adapted to engage the flange 48 on the outer end of the extending hub 49 of gear 8, which latter is carried in position to mesh with gear 12 by coil spring 50.

A modification of this construction is illustrated in Fig. 3 in which gear 8 is mounted to turn freely on shaft 2, the same being provided with a clutch face to engage a corresponding face on the hub 53, which latter is adapted to slide endwise on the key 52 on shaft 2. By this construction the gear 8 may be readily disconnected from the shaft 2 by the action of lever 43 when clutch 29 is moved into connection with gear 12, as above described, and when said clutch 29 is released from connection with gear 12 the clutch 23 is then carried by the pressure of spring 55 into engagement with the corresponding face on the gear 8.

The operation of my improved speed changing mechanism may be more fully described as follows: When the car is at rest all of the gears are in mesh with each other and the clutches are withdrawn. To reverse, clutch 23 is moved into connection with gear 16, which through idler 51, gears 5, 8 and 12 drives the car backward. To now start ahead slowly the clutch is moved from the reverse into connection with the first speed gear 17 which drives through gears 6, 8 and 12. The second or intermediate speed is now obtained by shifting the hand lever (not shown) to operate clutch 29, the forward end of which is connected to gear 18, which drives through gears 7, 8 and 12. To throw into high, the clutch is moved out of connection with gear 18 and into connection with gear 12, at the same time automatically withdrawing gear 8 from mesh with gear 12 through the action of lever 43, thus completely disconnecting the jack shaft from the main, and by this arrangement no gears whatever are being driven while running direct on the high speed thereby reducing the noise and frictional resistance to the minimum and transmitting the maximum power from the engine. In disconnecting, the gear 8 is automatically returned into mesh with gear 12 by the action of spring 50, ready again to perform its function when called upon to drive through any of the lower speeds.

My improved system of speed changing gears is extremely simple and practical in construction and effective in its operation.

Having thus described my invention, what I claim as new and desire to secure by Letters Patent is:

1. A speed changing mechanism comprising a main driving shaft, a jack shaft, a plurality of sets of gears on both shafts in constant engagement through which different speeds may be obtained, clutches for connecting said main shaft with the different speed gears, a power transmitting gear on the jack shaft meshing with the high speed gear, and means for withdrawing said transmitting gear from engagement with said high speed gear when the clutch is connected to the latter.

2. A speed changing mechanism comprising a main driving shaft, a jack shaft, gears on both shafts in constant engagement through which different speeds may be obtained, clutches for connecting said main shaft with the different speed gears, a power transmitting gear on the jack shaft meshing with the high speed gear, and means for automatically withdrawing said transmitting gear from engagement with said high speed gear when the clutch is connected to the latter.

3. A speed changing mechanism comprising a main driving shaft, a jack shaft, gears on both shafts in constant engagement through which different speeds may be obtained, clutches for connecting said main shaft with the different speed gears, a power transmitting gear on the jack shaft meshing with the high speed gear, and a lever operatively connecting one of said clutches with said transmitting gear whereby the latter is withdrawn from engagement with said high speed gear as said clutch is moved into engagement with said speed gear.

4. A speed changing mechanism comprising a main driving shaft, a jack shaft, a plurality of sets of gears on said shafts in constant engagement through which different speeds may be obtained, clutches for connecting said main shaft with the different speed gears, a power transmitting gear on the jack shaft meshing with the high speed gear, a pivoted lever operatively connecting one of said clutches with said transmitting gear whereby the latter is withdrawn from engagement with said high speed gear as said clutch is moved into engagement with said speed gear, and a spring for returning said transmitting gear to its engaging position when said clutch is released.

5. In a speed changing mechanism, the combination of a main driving shaft, a key in said shaft, a gear mounted to turn freely on said shaft, a collar on said shaft engaging the face of said gear for preventing the same from moving endwise on said shaft, said collar being provided with a recess in its face for receiving the end of said key whereby it is held from rotating and also from moving endwise on said shaft, a jack shaft, a gear on said jack shaft meshing with that on the said main shaft, and a clutch for connecting said main shaft with the gear mounted thereon.

6. In a speed changing mechanism, the combination of a main driving shaft, a key in said shaft, gears mounted to turn freely on said shaft, a collar on said shaft engaging the face of each gear for preventing the same from moving endwise on said shaft, said collar being provided with a recess in its face for receiving the end of said key whereby it is held from rotating and also from moving endwise on said shaft, a jack shaft, gears on said jack shaft meshing with those on the said main shaft, clutches for connecting said main shaft with the different speed gears, a power transmitting gear on the jack shaft meshing with the high speed gear, a pivoted lever operatively connecting one of said clutches with the said transmitting gear whereby the latter is withdrawn from engagement with said high speed gear as said clutch is moved into engagement with said speed gear, and a spring for returning said transmitting gear to its engaging position when said clutch is released.

In testimony whereof I affix my signature in presence of two witnesses.

ARTHUR A. PAGE.

Witnesses:
HOWARD E. BARLOW,
E. I. OGDEN.